United States Patent
Lawlor et al.

(10) Patent No.: US 11,024,054 B2
(45) Date of Patent: Jun. 1, 2021

(54) METHOD, APPARATUS, AND SYSTEM FOR ESTIMATING THE QUALITY OF CAMERA POSE DATA USING GROUND CONTROL POINTS OF KNOWN QUALITY

(71) Applicant: HERE GLOBAL B.V., Eindhoven (NL)

(72) Inventors: David Johnston Lawlor, Chicago, IL (US); Anish Mittal, San Francisco, CA (US); Niranjan Kotha, Chicago, IL (US); Jeff Connell, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 189 days.

(21) Appl. No.: 16/414,491

(22) Filed: May 16, 2019

(65) Prior Publication Data

US 2020/0364898 A1 Nov. 19, 2020

(51) Int. Cl.
*G06T 7/73* (2017.01)
*G06T 7/80* (2017.01)
*G06T 7/521* (2017.01)

(52) U.S. Cl.
CPC ............ *G06T 7/74* (2017.01); *G06T 7/521* (2017.01); *G06T 7/75* (2017.01); *G06T 7/80* (2017.01); *G06T 2207/30244* (2013.01)

(58) Field of Classification Search
CPC .. G06T 7/521; G06T 7/74; G06T 7/75; G06T 7/80; G06T 2207/30244
See application file for complete search history.

(56) References Cited

U.S. PATENT DOCUMENTS

| 10,033,985 B2 | 7/2018 | Engedal |
| 2005/0140670 A1* | 6/2005 | Wu .......................... G06T 17/20 345/419 |

(Continued)

FOREIGN PATENT DOCUMENTS

| CN | 107481292 A | 12/2017 |
| WO | 2012134237 A2 | 10/2012 |
| WO | 2018214086 A1 | 11/2018 |

OTHER PUBLICATIONS

Kumar et al. ("Sensitivity of the Pose Refinement Problem to Accurate Estimation of Camera Parameters," IEEE Proceedings of the Third International Conference on Computer Vision, Dec. 4, 1990) (Year: 1990).*

(Continued)

*Primary Examiner* — Yubin Hung
(74) *Attorney, Agent, or Firm* — Ditthavong, Steiner & Mlotkowski

(57) ABSTRACT

An approach is provided for determining the quality of camera pose data. The approach, for example, involves identifying camera pose data for a camera used to capture an image. The approach further involves processing the image to determine a pixel location of features visible in the image, wherein each feature has a known physical location (e.g., obtained using survey techniques or equivalent). The approach further involves determining a camera physical location of the camera based on the camera pose data. The approach further involves determining an physical location of the image plane based on the camera pose data and/or camera parameters (e.g., intrinsic camera parameters). The approach further involves projecting a ray from the camera physical location thorough the image plane physical location corresponding to the pixel location determined for each feature, and computing a minimum distance between the projected ray and the known physical location of each (Continued)

feature. The approach further involves providing an aggregation of the minimum distances as an output indicating a quality of the camera pose data.

20 Claims, 17 Drawing Sheets

(56) References Cited

U.S. PATENT DOCUMENTS

| | | | | |
|---|---|---|---|---|
| 2007/0253618 | A1* | 11/2007 | Kim | G06T 7/80 |
| | | | | 382/154 |
| 2015/0172626 | A1* | 6/2015 | Martini | G06K 9/46 |
| | | | | 348/50 |
| 2016/0364867 | A1* | 12/2016 | Moteki | G06T 7/73 |
| 2017/0018086 | A1* | 1/2017 | Zhang | H04N 5/232 |
| 2017/0249751 | A1* | 8/2017 | Indelman | G06T 7/579 |
| 2018/0045519 | A1* | 2/2018 | Ghadiok | G06K 9/2054 |
| 2018/0075593 | A1* | 3/2018 | Wang | G06T 7/85 |
| 2019/0082173 | A1* | 3/2019 | Schilling | H04N 17/002 |

OTHER PUBLICATIONS

Kendall et al. ("Geometric Loss Functions for Camera Pose Regression with Deep Learning," arXiv:1704.00390v2 [cs.CV], May 23, 2017)) (Year: 2017).*

Wendel et al. ("Extrinsic Parameter Calibration for Line Scanning Cameras on Ground Vehicles with Navigation Systems Using a Calibration Pattern," Sensors (Basel), 17(11), Nov. 2017) (Year: 2017).*

Ababsa et al. ("Robust camera pose estimation combining 2D/3D points and lines tracking," IEEE International Symposium on Industrial Electronics, Jun. 30-Jul. 2, 2008) (Year: 2008).*

Jaspers et al. ("High accuracy model-based object pose estimation for autonomous recharging applications," IEEE Winter Conference on Applications of Computer Vision (WACV), Mar. 7-10, 2016) (Year: 2016).*

Deng et al., Abstract of "Incremental image set querying based localization", Neurocomputing, vol. 208, Oct. 5, 2016, retrieved on May 16, 2019 from "https://www.sciencedirect.com/science/article/pii/S0925231216304738", 4 pages.

* cited by examiner

METHOD, APPARATUS, AND SYSTEM FOR ESTIMATING THE QUALITY OF CAMERA POSE DATA USING GROUND CONTROL POINTS OF KNOWN QUALITY

BACKGROUND

Modern location-based services and applications (e.g., autonomous driving) are increasingly demanding highly accurate and detailed digital map data (e.g., centimeter-level accuracy or better) across wide geographic areas. To achieve such levels of coverage, map service providers have relied on data (e.g., imagery) collected from a variety of sources with different views or perspectives (e.g., top down imagery from aerial cameras, and ground-level imagery for surface vehicles, etc.). Map service providers can then, for instance, identify common semantic features (e.g., lane markings, signs, etc.) across the image views for map making, localization, and/or other similar location-based services. To identify the common semantic features the map service providers use ray intersection based on the geometry of the cameras used to capture the images (e.g., triangulating the location of features given their pixel positions in the images). For example, the geometry can be determined in part from camera pose data such as camera position data (e.g., locations of the camera when the corresponding images were captured) and orientation data (e.g., pointing direction). To ensure precise semantic identification of semantic features the service providers must have accurate camera pose data. Accordingly, map service providers face significant technical challenges to estimate the quality of camera pose data given the lack of reliability of position sensors.

SOME EXAMPLE EMBODIMENTS

Therefore, there is a need for an approach for estimating the quality of camera pose data using ground control points of known quality.

According to one embodiment, a method comprises identifying camera pose data for a camera used to capture an image. The method also comprises processing the image to determine a pixel location of one or more features visible in the image, wherein each feature of the one or more features has a known physical location (e.g., obtained using survey techniques or equivalent). The method further comprises determining a camera physical location of the camera based on the camera pose data. The method further comprises determining an image plane physical location of the image plane of the image based on the camera pose data, one or more camera parameters of the cameras (e.g., intrinsic camera parameter such as focal length or other optical characteristics) or a combination thereof. The method further comprises projecting a ray from the camera physical location thorough the image plane physical location corresponding to the pixel location determined for said each feature. The method further comprises computing a minimum distance between the projected ray and the known physical location of said each feature. The method further comprises providing an aggregation of the minimum distance for said each feature as an output indicating a quality of the camera pose data.

According to another embodiment, an apparatus for estimating the quality of camera pose data using ground control points of known quality comprises at least one processor, and at least one memory including computer program code for one or more computer programs, the at least one memory and the computer program code configured to, with the at least one processor, cause, at least in part, the apparatus to identify camera pose data for a camera used to capture an image. The apparatus is also caused to process the image to determine a pixel location of one or more features visible in the image, wherein each feature of the one or more features has a known physical location (e.g., obtained using survey techniques or equivalent). The apparatus is further caused to determine a camera physical location of the camera based on the camera pose data. The apparatus is further caused to determine an image plane physical location of the image plane of the image based on the camera pose data, one or more camera parameters of the camera (e.g., intrinsic camera parameter such as focal length or other optical characteristics), or a combination thereof. The apparatus is further caused to project a ray from the camera physical location thorough the image plane physical location corresponding to the pixel location determined for said each feature. The apparatus is further caused to compute a minimum distance between the projected ray and the known physical location of said each feature. The apparatus is further caused to provide an aggregation of the minimum distance for said each feature as an output indicating a quality of the camera pose data.

According to another embodiment, a non-transitory computer-readable storage medium carrying one or more sequences of one or more instructions which, when executed by one or more processors, cause, at least in part, an apparatus to identify camera pose data for a camera used to capture an image. The apparatus is also caused to process the image to determine a pixel location of one or more features visible in the image, wherein each feature of the one or more features has a known physical location (e.g., obtained using survey techniques or equivalent). The apparatus is further caused to determine a camera physical location of the camera based on the camera pose data. The apparatus is further caused to determine an image plane physical location of the image plane of the image based on the camera pose data, one or more camera parameters of the camera (e.g., intrinsic camera parameter such as focal length or other optical characteristics), or a combination thereof. The apparatus is further caused to project a ray from the camera physical location thorough the image plane physical location corresponding to the pixel location determined for said each feature. The apparatus is further caused to compute a minimum distance between the projected ray and the known physical location of said each feature. The apparatus is further caused to provide an aggregation of the minimum distance for said each feature as an output indicating a quality of the camera pose data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for estimating the quality of camera pose data using ground control points of known quality. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
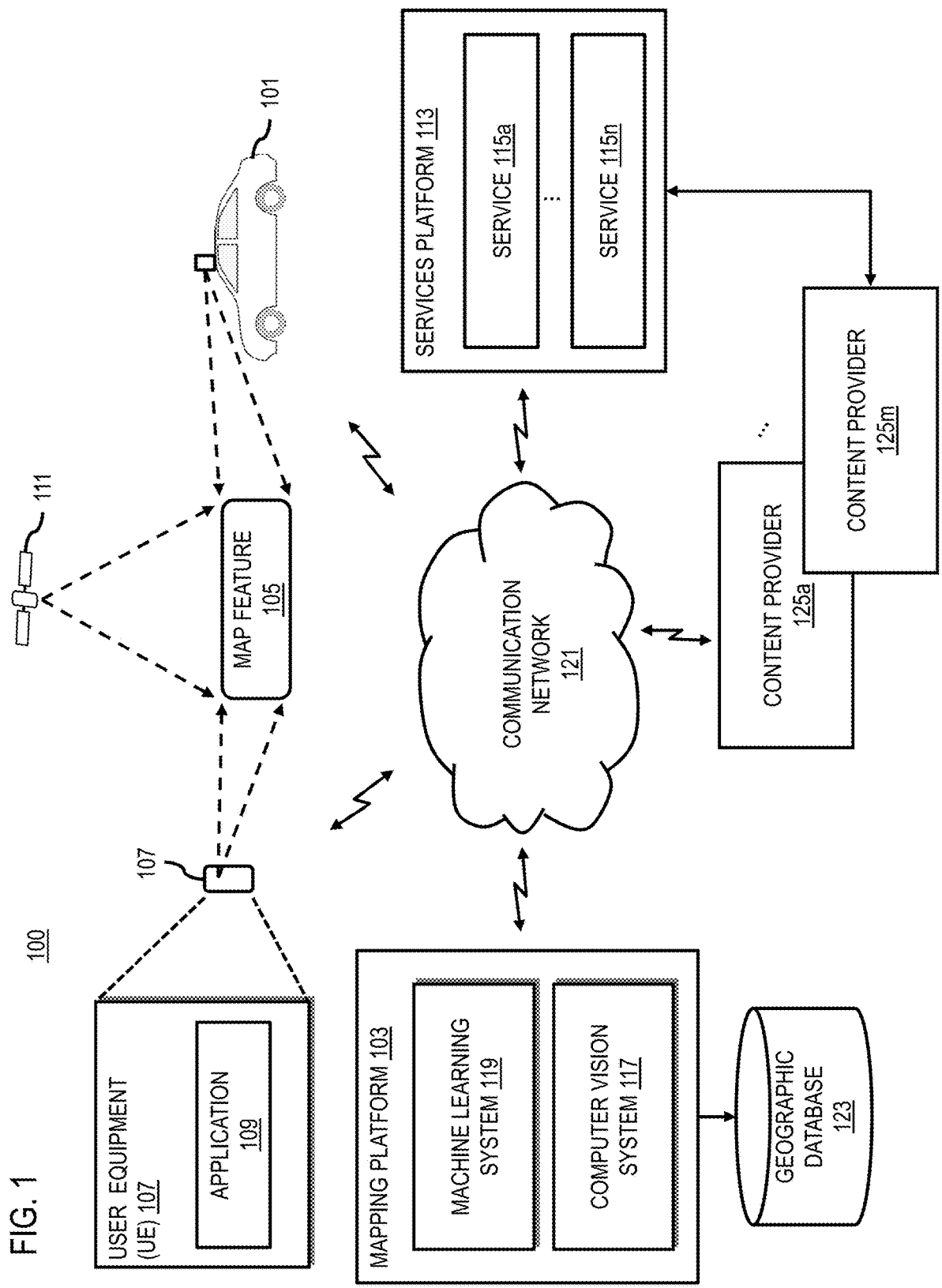
FIG. 1 is a diagram of a system capable of estimating the quality of camera pose data using ground control points of known quality.

FIG. 1 is a diagram of a system capable of estimating the quality of camera pose data using ground control points of known quality, according to one embodiment. As indicated above, many location-based services and applications rely on accurate map data. In one use case, automated driving is quickly becoming a reality following advances in machine learning, computer vision, and compute power. The ability to perceive the world with an accurate semantic understanding enables vehicles (e.g., an autonomous vehicle 101) to obey driving rules and avoid collisions. As these perceptual abilities have improved, so too has the need for highly accurate and up-to-date maps. Path planning, for instance, requires knowledge of what to expect beyond a vehicle 101's perceptual horizon, and driving in complicated urban environments with many occluding objects requires a knowledge of what cannot be detected by onboard sensors. In response, map service providers (e.g., operating a mapping platform 103) are creating the most accurate and up-to-date high-resolution map for automated driving (e.g., a geographic database 123). A wide range of automated applications including transportation, guidance, and search and rescue require digital maps to be in the form of models of the environment. Learning and automating the map creation and update has therefore been a major research focus in the robotics and artificial intelligence (AI) community in the last decades.

Different sources of raw data (e.g., image data) can be exploited to make a map. For example, top down sources, like satellite, aerial and drone images, which are accurate photographs of the Earth's surface from a top down perspective, can be used to precisely determine the location of roads, and other features (e.g., map feature 105) on the Earth. These images help create maps at a much larger scale but are more limited to surface features.

Ground sources like cars, robots, and/or mobiles devices (e.g., user equipment, UE, 107) are also exploited to acquire an accurate model of their environment using sensing systems like cameras and running perception algorithms on the acquired data (e.g., by executing an application 109). Processing ground sources generally requires more effort and resources to do a larger scale city level collection, but the resulting images can be used to detect features (e.g., map feature 105) that are above the ground as well like traffic lights, signs etc. which may not be visible from a top down image or source. Therefore, mapping a more complete set of features in an area may often require using both top down and ground level sources.

To facilitate and/or monitor the accuracy of digital map data stored in the geographic database 123, map service providers can designate ground control points. In one embodiment, ground control points are defined as identifiable points on the Earth's surface that have precise location (e.g., in the form of <Latitude, Longitude, Elevation>) associated with them. These points play a vital role in being able to measure the quality and correction of different data sources.

For high definition map use (e.g., with centimeter level accuracy), correct camera pose data is essential for the accuracy of digital maps. Traditionally, the quality of the camera pose data is determined by the confidence associated with the GPS and inertial measurement units (IMUs) devices on board. Accordingly, map service providers face significant technical challenges to automatically assess the quality of camera pose data instead of relying on less precise confidence values associated with the devices.

To address these problems, the system 100 of FIG. 1 introduces a capability for estimating the quality of camera pose data using ground control points of known quality, according to one embodiment. In one embodiment, the system 100 can process annotated images, which designate ground control points or map features. The annotated images include camera pose data and camera technical parameters (e.g., field of view, focal length, camera lens used, etc.). The camera pose data includes position data (e.g., locations of the camera when the corresponding images were capture), orientation data (e.g., pointing direction). Using the camera pose data, the system 100 can determine the physical location of the camera. The system 100 can then use the camera pose data and the camera parameters to determine the position of the image planes of the images. The image planes, for instance, represent the location of the camera's fields of view in three-dimensional space, thereby enabling the system 100 to determine the relative orientation of the images with respect to each other. The system 100 then generates rays from the respective camera positions through the locations of features in the image planes. The system 100 can then use the minimum distance between the generated rays and the known physical location of the features to determine the quality of the camera pose data. The system 100 can use the aggregation of the minimum distances as an output indicating a quality of the camera pose data. For example, aggregation can use any statistical calculation including but not limited to averaging, determining a median, determining a minimum/maximum, etc. Embodiments of the ray intersection technical solution described herein can be very computationally simple, and easy to implement based on pure geometry. This, in turn, enables the system 100 advantageously reduce the computing resources (e.g., processing power, memory, bandwidth, etc.) used for determining the quality of camera pose data. Additionally, the procedure can be used at different stages of the camera pose data refinement process. For example, the raw captured data is processed through different stages of alignment and adjustment. This procedure can be used at any stage of the processing pipeline allowing for more accurate and reliable mapping products.

Figure 2:
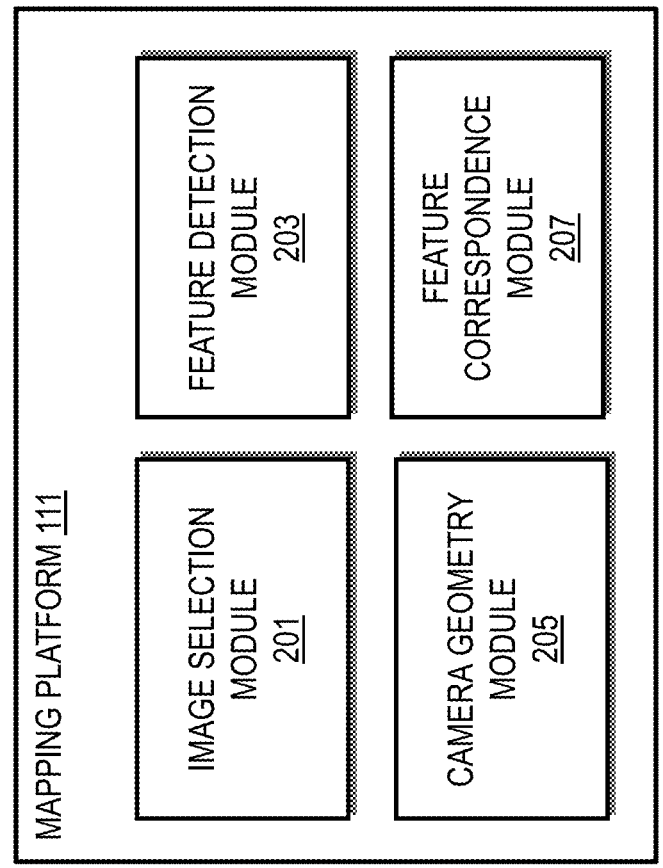
FIG. 2 is a diagram of components of a mapping platform capable of estimating the quality of camera pose data using ground control points of known quality, according to one embodiment.

In one embodiment, as shown in FIG. 2, the mapping platform 103 includes one or more components for estimating the quality of camera pose using ground control points of known quality, according to the various embodiments described herein. It is contemplated that the functions of these components may be combined or performed by other components of equivalent functionality. In this embodiment, the mapping platform 103 includes an image selection module 201, feature detection module 203, camera geometry module 205, and a feature correspondence module 207. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100 (e.g., a component of the services platform 113, services 115*a*-115*n* (also collectively referred to as services 115), vehicle 101, UE 107, application 109 executing on the UE 107, etc.). In another embodiment, one or more of the modules 201-207 may be implemented as a cloud-based service, local service, native application, or combination thereof. The functions of the mapping platform 103 and the modules 201-207 are discussed with respect to FIGS. 3-10 below.

Figure 3:
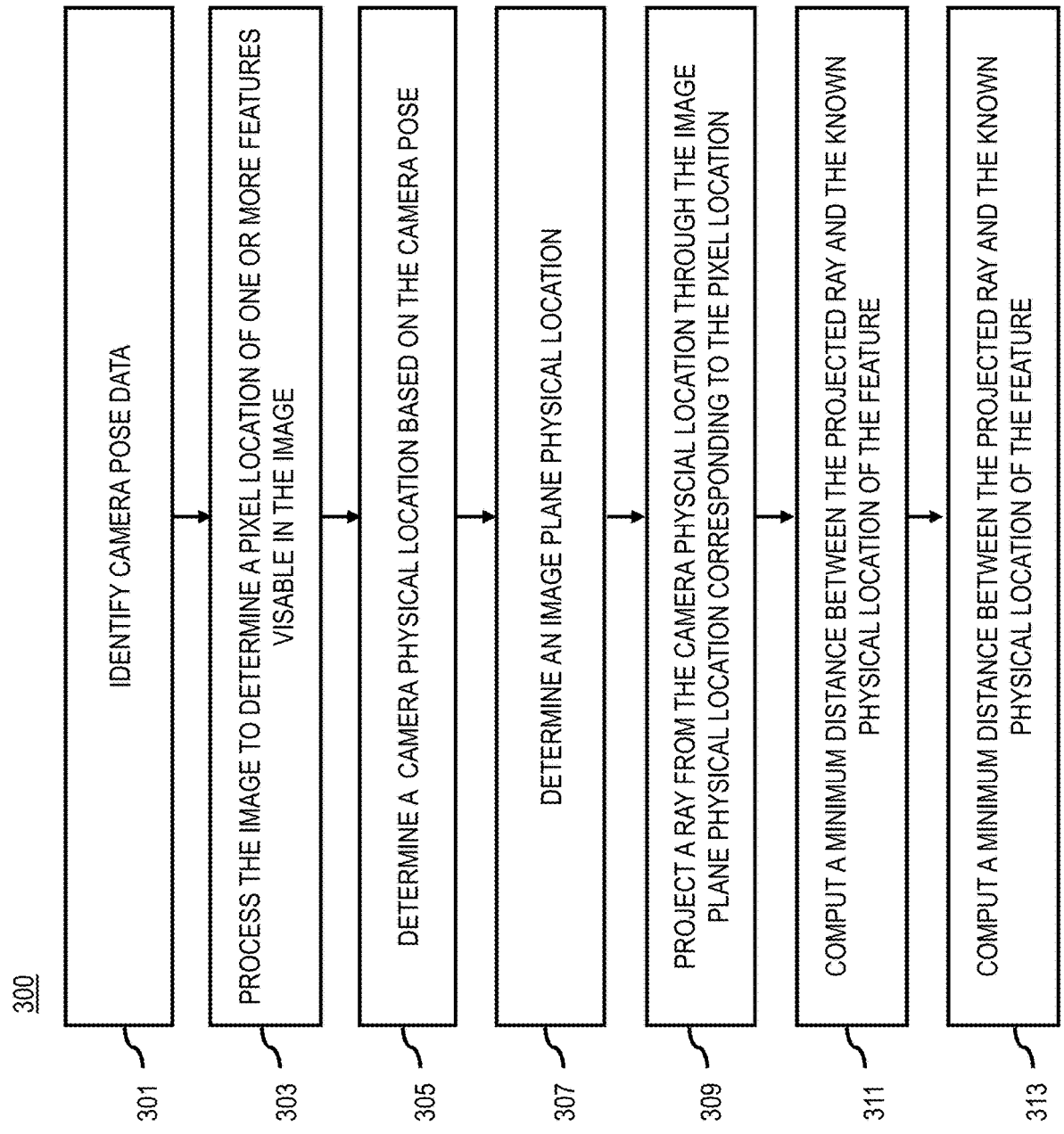
FIG. 3 is a flowchart of a process for estimating the quality of camera pose data using ground control points of known quality.
Figure 11:
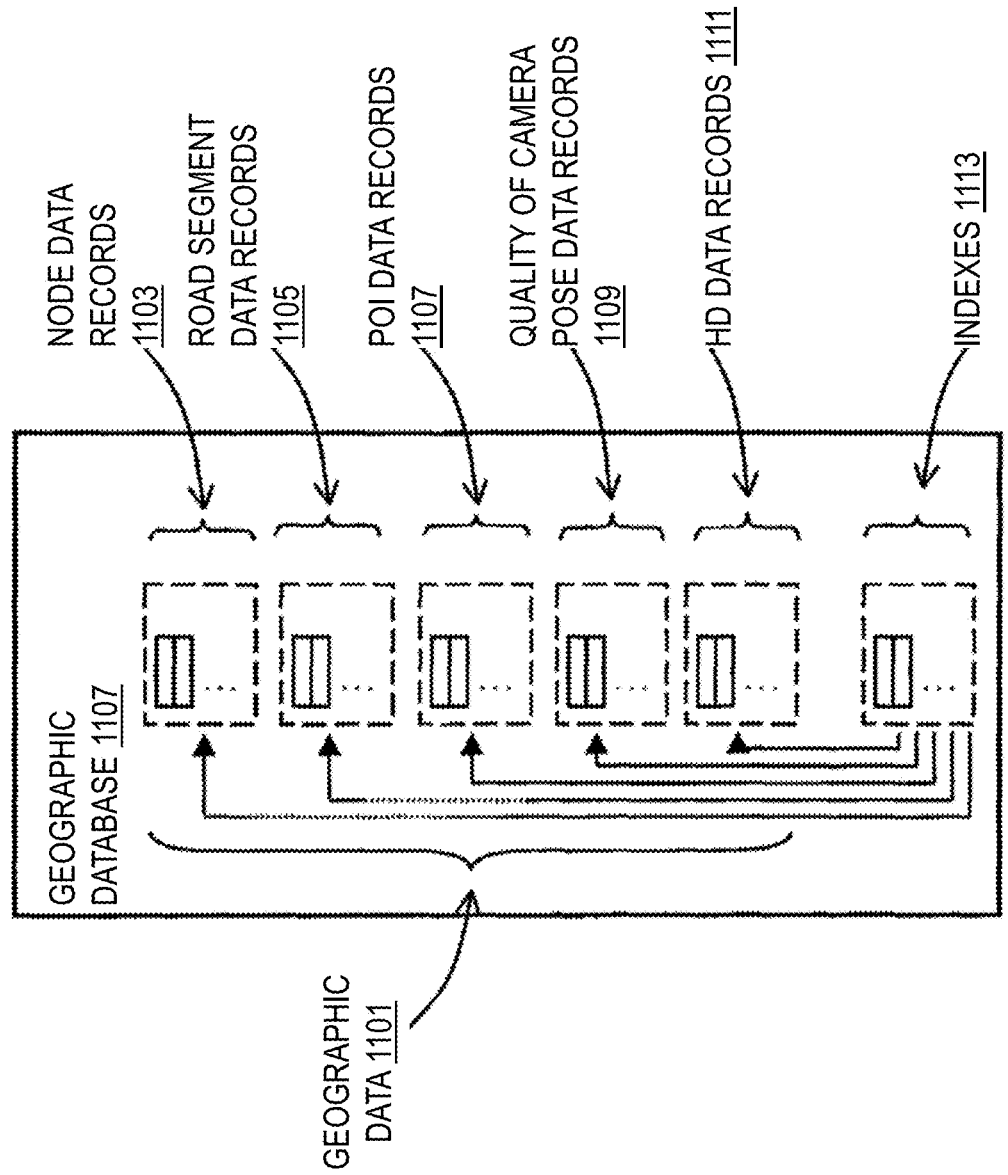
FIG. 11 is a diagram of a geographic database, according to one embodiment.

FIG. 3 is a flowchart of a process for estimating the quality of camera pose data using ground control points of known quality, according to one embodiment. In various embodiments, the mapping platform 103 and/or any of the modules 201-207 may perform one or more portions of the process 300 and may be implemented in, for instance, a chip set including a processor and a memory as shown in FIG. 11. As such, the mapping platform 103 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 301, the image selection module 201 selects or receives a first image (e.g., from a user; system administrator; image database—e.g., provided by the service platform 113, services 115*a-n*, or content providers 125*a-n*; etc.) that has one or more features, with known physical locations, and camera pose data associated with the first image. In one embodiment, the known physical locations of the features can be determined by survey techniques, queried from digital map data, and/or any other equivalent technique. Examples of features with known physical location include but are not limited to ground control points which identifiable physical features whose locations have been precisely surveyed. The first image is taken by a first camera associated with the camera pose data. Features refer to any feature that is photo-identifiable in the image including, but not limited to, physical features on the ground that can be used as possible candidates for ground control points. In other words, it is contemplated that features refer to a broader category of photo-identifiable features than just control ground points. Accordingly, as used herein, references to either feature or ground control point individually is intended to also refer to the other un-mentioned term (e.g., feature or ground control point) alone or in combination. Further the one or more features have a known physical location.

In step 303, the image selection module 201, interacts with the feature detection module 203 to determine a pixel location of the one or more features visible in the first image. By way of example, a labeled pixel is a pixel annotated by a labeler (e.g., a human labeler) as corresponding to a feature of interest, and a detected pixel is a pixel determined by a computer system (e.g., computer vision system using machine learning) to be classified as corresponding to a feature of interest.

In one embodiment, the selected images can be labeled with features that are photo-identifiable in the images, of otherwise have detected features. Labeling, for instance, refers to identifying pixels or groups of pixels in the images that correspond to the feature or features, typically but not necessarily by a human. In addition or alternatively, the pixels of the selected image can be detected by automated machine processes. For example, the feature detection module 203 can detect any map feature that is visible in both top down and ground level imagery (or imagery from any perspectives or views of interest). The feature detection module 203 can use, for instance, a computer vision system 117 in combination with a machine learning system 119 (e.g., a neural network or equivalent) to recognize the pixels of the images that correspond to the visible feature. For example, the identified feature or features can include but are not limited to intersection-related features, which are generally visible in both top down and ground level images. While any type of visible or photo-identifiable features can be used according to the embodiments described herein, intersection-related features (e.g., curvilinear geometry intersection features) are particularly suited for automated identification (e.g., via the computer vision system 117) because they exhibit the following properties: (1) have a consistent definition, (2) are uniquely identifiable, (3) have spatial sparsity, and/or (4) are generalizable across different geographic regions.

In step 305, the camera geometry module 205 determines the physical location of the first camera based on the camera pose data. In one embodiment, the camera geometry module 205 determines the camera position of the camera, which took the first image. The geometry module 205 determines the camera's physical position using extracted image metadata or other data stored indicating the camera pose data for the first image. The camera geometry module 205 locates the first camera's physical location in a common coordinate system (e.g., a global or real-world coordinate system indicating <Latitude, Longitude, Elevation>).

In step 307, the camera geometry module 205 determines an image plane physical location of an image plane of the first image based on the camera pose data, one or more camera parameters of the camera (e.g., intrinsic parameters such as physical specifications, optical characteristics, and/ or the like), or a combination thereof. The camera geometry module 205 can use the camera pose data and/or camera technical specifications (e.g., focal length, camera lens, aperture, exposure, etc.) to locate a physical location of the image plane within the common coordinate system. The image plane refers to the apparent location in three-dimensional space of the image, thereby enabling the camera geometry module 205 to translate each pixel location (including feature-labeled or detected pixel locations) in the first image into the common coordinate system.

In step 309, the camera geometry module 205 projects a ray from the first camera's physical location through the image plane's physical location corresponding to the pixel location of one of the one or more features. In other words, the camera geometry module 205 computes a first ray from the first camera's physical location through the first labeled or detected pixel location, where the pixel location represents one of the one or more features. Each ray corresponds to a feature with a known physical location.

In one embodiment, the camera geometry module 205 can generate a ray (e.g., a line or line segment) from the first camera position (e.g., expressed in real-world coordinates or coordinates common to the pictures being analyzed) to the determined location of each feature-labeled or detected pixel (e.g., also expressed in real-world coordinates or coordinates common to the picture being analyzed). In other words, the camera geometry model 205 can generate multiple rays, where each ray corresponds to an individual feature.

In step 311, the camera geometry module 205 can compute a distance between the projected rays and the corresponding features with known locations. The camera geometry module 205 can map the true location of a known feature, using the known physical location of a feature, into the common coordinate system (e.g., real-world location given by <Latitude, Longitude, Elevation> or equivalent). The camera geometry module 205 can compute the minimum perpendicular distance between each ray and the corresponding location of the known feature. The minimum perpendicular distance between the true location of the feature and the corresponding ray is the discrepancy in the camera pose data. With multiple features there will be corresponding true locations for each feature and generated rays for each feature. In an embodiment, a first feature will have a first true location and a first generated ray. The same image may have a second feature with a second true location and a second generated ray. In this example, there will be a first minimum perpendicular distance (between the first true location and first generated ray) and a second minimum perpendicular distance (between the second true location and second generated ray). Two features are discussed in this embodiment, but the image could have many more features or only one. The minimum perpendicular distances can be aggregated using different measures of central tendency (e.g., mean, median, mode, and so forth). In another embodiment a weighting scheme based on the inverse distance of the features to the camera center could be used since the confidence in observing a physical point by the camera changes inversely as a function of the distance from the capture.

In step 315, the camera geometry module 205 provides an aggregation of minimum distance data indicating the quality of the camera pose data. The camera geometry module 205 can calculate the deviation of the aggregated minimum perpendicular distances to provide an output associated with quality of the camera pose data. In one embodiment the camera geometry module 205 can flag certain camera pose data as unreliable. The camera geometry module 205 can flag the camera pose data if the aggregation of minimum distances is greater than an error threshold. The camera geometry module 203 can have a defined error threshold. The error threshold represents, for instance, the cutoff minimum distance value between the rays generated by the camera pose data and the known location of the feature that will be used to classify whether the camera data pose data is a quality outlier.

Figure 4:
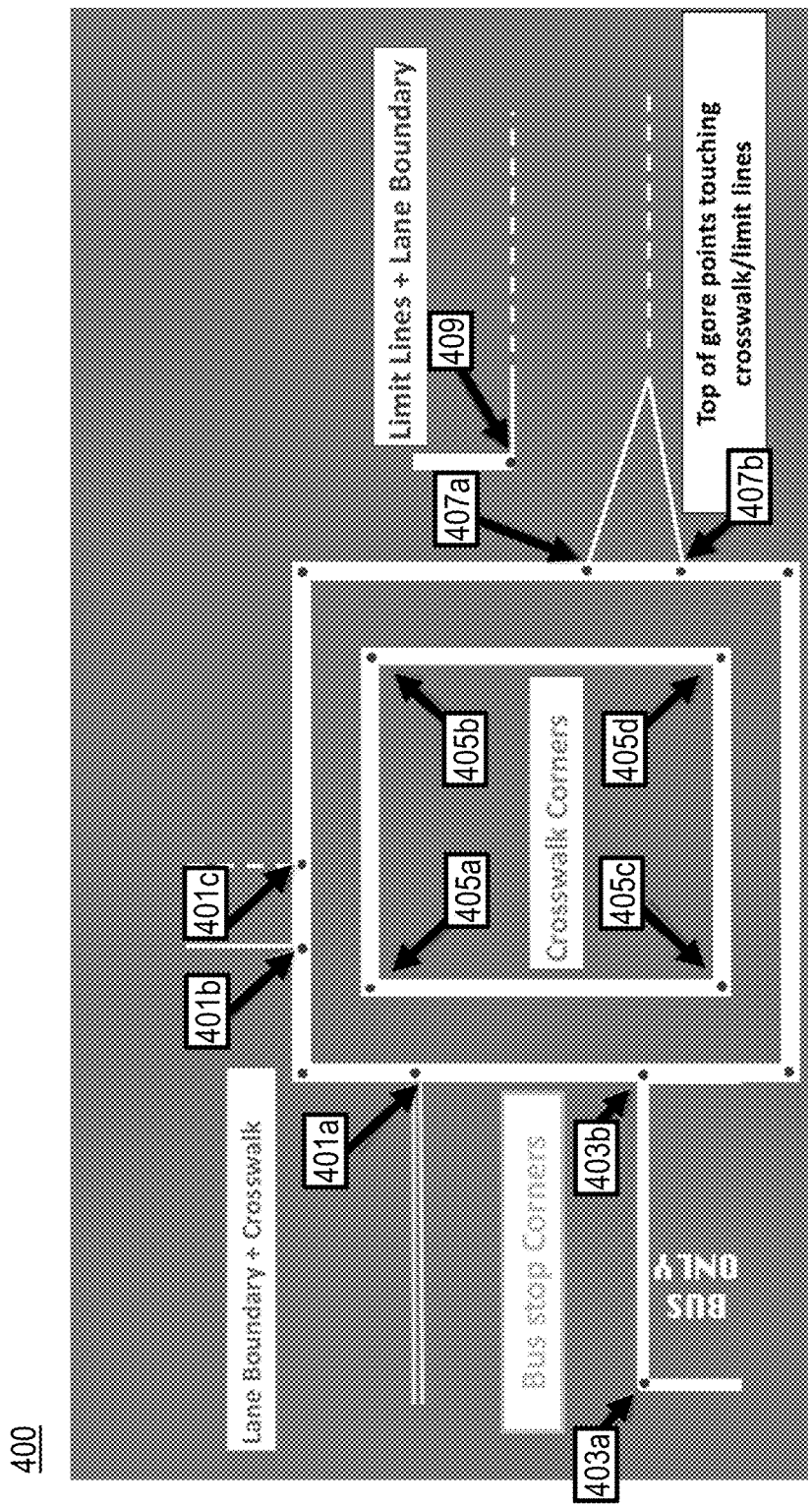
FIG. 4 is a diagram illustrating example intersection features, according to one embodiment.

As discussed above, one example of a feature that is labeled in images includes but is not limited to ground control points. FIG. 4 is a diagram illustrating example intersection features that can be found at a typical intersection, according to one embodiment. The example of FIG. 4 illustrates a schematic drawing of a typical intersection 400 at which intersection features created by various geometries of the lane lines, crosswalks, bus stops, and/or any other identifiable object or marking found at the intersection 400. An intersection refers, for instance, to a geographic area at which two or more road segments intersect, converge, and/or diverge. As shown, intersection features in the category of curvilinear geometry include but are not limited to:

(1) Points 401a-401c at which a lane boundary (e.g., lane line or marking) meets a crosswalk;
(2) Points 403a and 403 that correspond to the corners of road markings indicating a bus stop;
(3) Points 405a-405d that correspond to the corners of a crosswalk;
(4) Points 407a and 407b that are the top of gore points touching a crosswalk or limit lines (e.g., lines designating the limit or boundaries of other features such as lanes); and
(5) Point 409 at which a limit line meets a lane boundary.

The intersection features identified above typically meet the criteria or properties for being classified as ground control points.

In one embodiment, the intersection feature/ground control point is selected so that the intersection feature is uniquely identifiable from among other intersection features from the category of curvilinear geometry intersection features (e.g., see designated property item (2) above). In other words, a single feature should only be classified under one feature definition category. For example, if a feature that is classified as "a lane boundary with a crosswalk" should also not satisfy the definition for being a "gore point" or vice versa.

In another embodiment, the intersection feature is selected based on determining that the intersection feature has a spatial sparsity that meets a sparsity criterion (e.g., see designated property item (3) above). Features that repeat often within a designated area (i.e., not sparse or appear in numbers greater than the sparsity threshold) are not well suited as ground control points because they can be more difficult to uniquely identify and match as against known ground control points. For example, features such as dashes of a lane line, stripes in a crosswalk, multiple line paint intersections in restricted zones, zebra stripes, etc. that repeat often over small distances can be poor ground control point candidates.

Figure 5A:
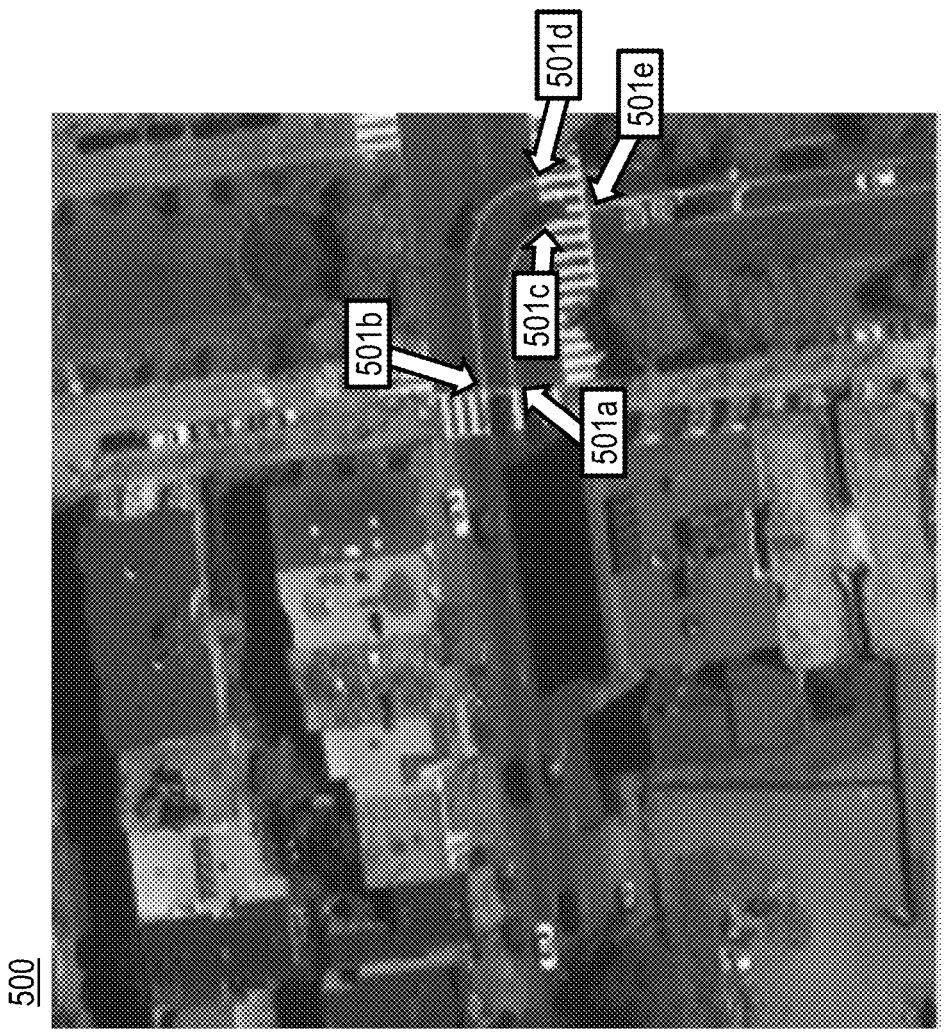
FIGS. 5A-5C are diagrams illustrating example imagery of intersection features, according to one embodiment.
Figure 5B:
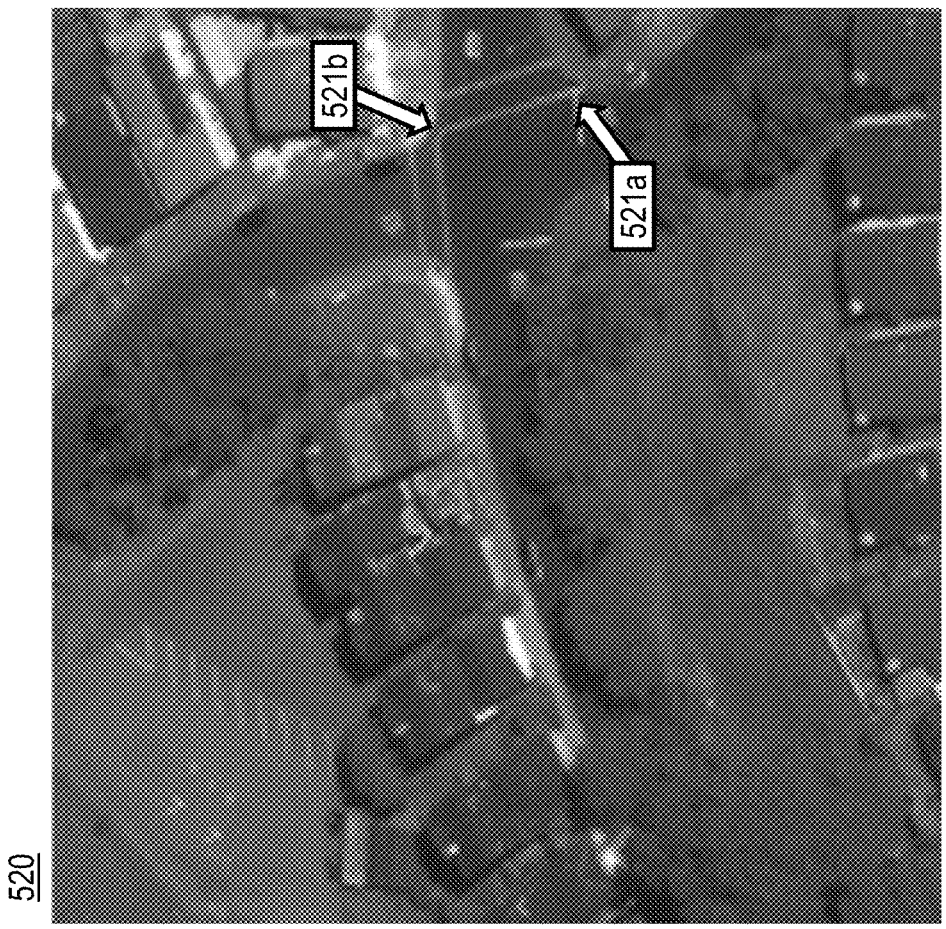
Figure 5C:

FIGS. 5A-5C illustrate example imagery of some of the intersection features illustrated in FIG. 4, according to one embodiment. For example, FIG. 5A illustrates top down imagery 500 that depicts ground control points 501a-501e at which a lane boundary meets a crosswalk. FIG. 5B illustrates to-down imagery 520 that depicts ground control points 521a and 521b that are crosswalk corners. FIG. 5C illustrates top down imagery 540 that depicts ground control points 541a and 541b at which a limit line meets a lane line. Each of the ground control points illustrated in FIGS. 5A-5C are an intersection features from a category of curvilinear geometry intersection features that are a visible feature of a roadway intersection (e.g., visible from a top down imagery perspective).

After selecting the features that are to be designated as ground control points, the feature detection module 203 can label and/or retrieve a plurality of ground truth images depicting the intersection feature. In one embodiment, the plurality of ground truth images is labeled with known pixel location data of the intersection as respectively depicted in each of the plurality of ground truth images. The known pixel location data indicate which pixel(s) of a ground truth image correspond to ground control points that are present in the image. As previously described, the known pixel location data can be used to determined pixel correspondences between multiple images to determine real world three-dimensional locations of the ground control point (e.g., intersection feature) comprising a latitude, longitude, and elevation. The ground truth images can also include multiple images of the same ground control point or learnable feature (e.g., captured at different times, from different sources, etc.).

In one embodiment, to determine or label pixel location data, the feature detection module 203 can process the images using image recognition or equivalent to identify the pixels of each image corresponding to the selected intersection features/ground control points. In other words, following the identification of candidate feature points in several top down images, corresponding image pixel locations are identified. In one embodiment, for each real-world feature (e.g., line intersection), the corresponding pixel coordinates in two or more images are recorded, creating a pixel correspondence of the form $\{(u_1, (u_2, v_2), \ldots \}$ or equivalent. Here, u and v are pixel locations of the same physical object or feature depicted in the images (e.g., pixel locations along the x and y axis respectively of a pixel grid comprising the image), and the subscript indicates in which image the feature is labeled.

Figure 6:
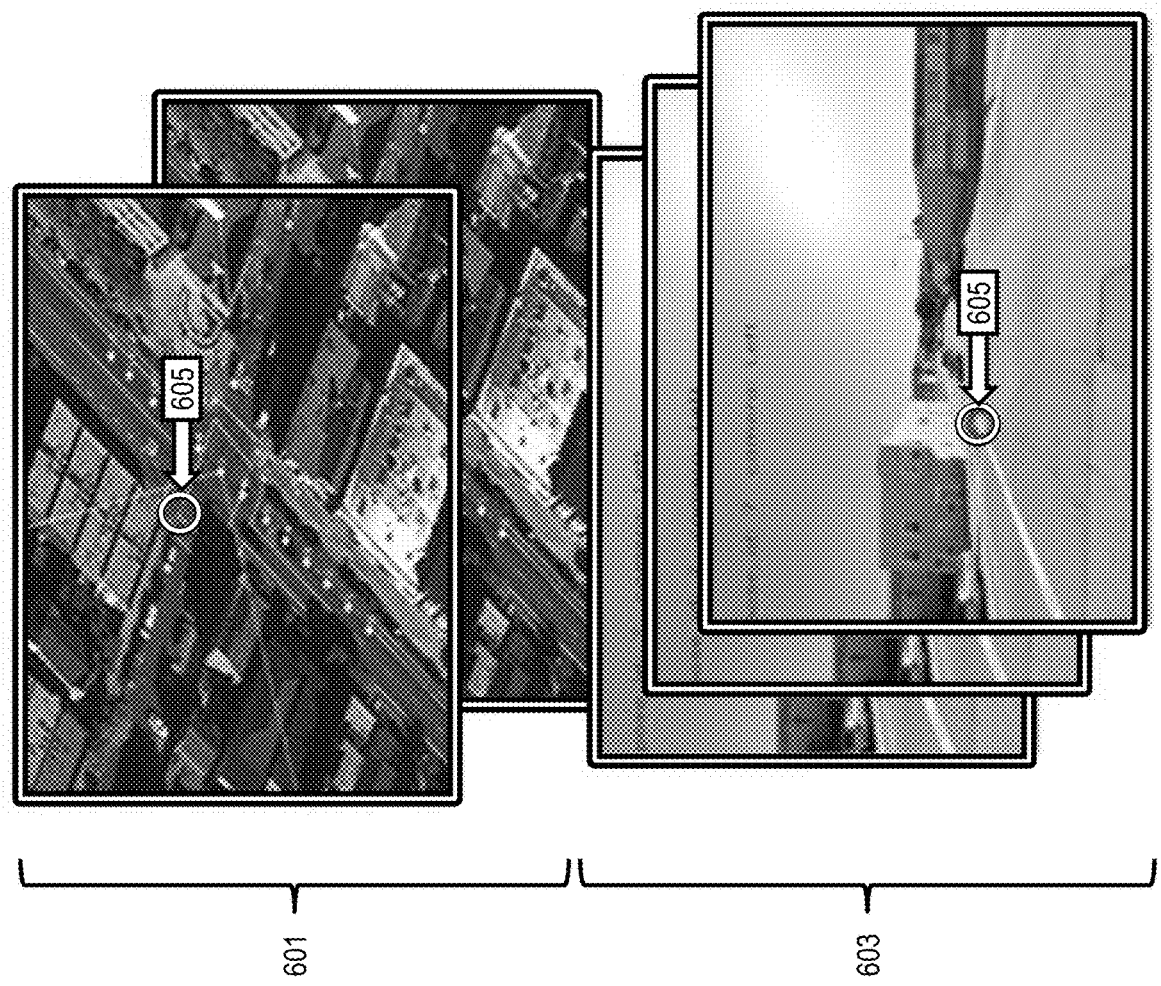
FIG. 6 is a diagram illustrating example image data from different sources depicting the same feature, according to one embodiment.

FIG. 6 illustrates examples of a set of top down images 601 from a first source (e.g., an aerial or top source such as a satellite 111) and a set of ground level images 603 from a second source (e.g., a ground level source such as a camera mounted on a vehicle 101, UE 107, robot, or other system traveling on the ground). In this example, the top down images 601 and ground level images 603 depict the same map or semantic feature 605 (e.g., a crosswalk corner formed by the joining of two lines of a crosswalk painted in an intersection). By way of example, top down imagery refers to images or image data that are captured from an overhead or aerial perspective (e.g., from a drone, satellite, and/or the like) so that the camera is pointed down towards the intersection or ground level from an overhead height. Ground-level imagery refers to images or image data captured while the camera is located at ground level or mounted on a vehicle or system that is located at ground level with the camera pointed towards the feature or object being captured (e.g., a dash cam or equivalent).

In other embodiments, the feature can be ground control points that are identifiable points on the Earth's surface that have precise location (e.g., in the form of <Latitude, Longitude, Elevation>) associated with them. These ground control points, for instance, can be collected by ground surveyors who go out in the field and use instruments like a theodolite, measuring tape, three-dimensional (3D) scanner, satellite-based location sensors (e.g., GPS/GNSS), level and rod, etc. to measure the locations of ground control points with high accuracy.

Figure 7A:
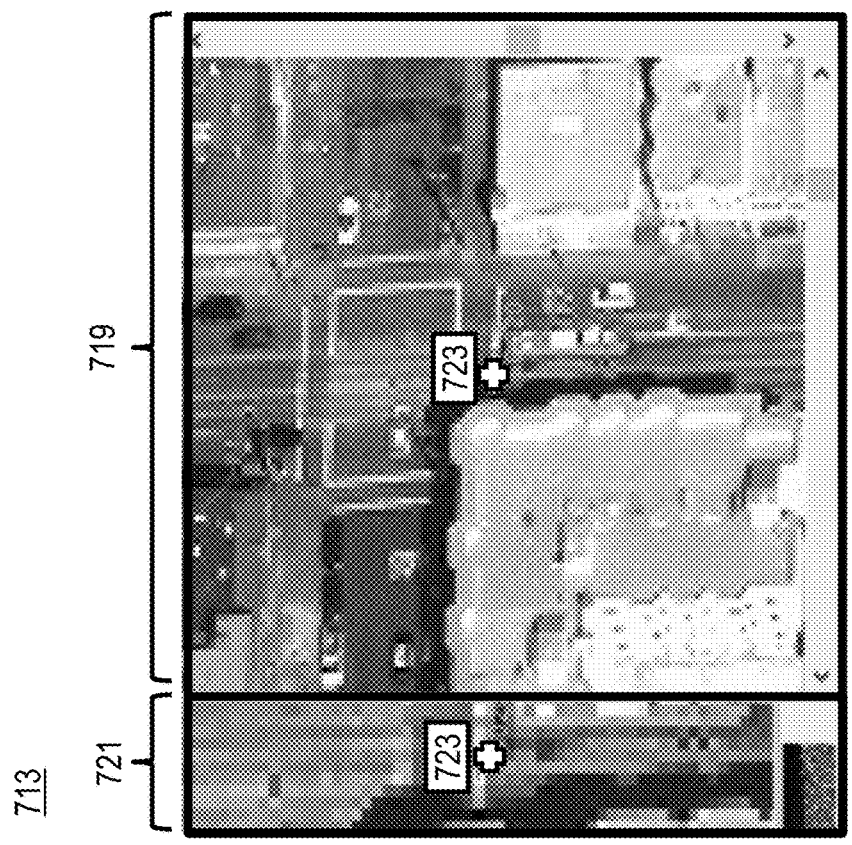
FIGS. 7A-7B are diagrams illustrating example imagery of intersection features, according to one embodiment.
Figure 7B:
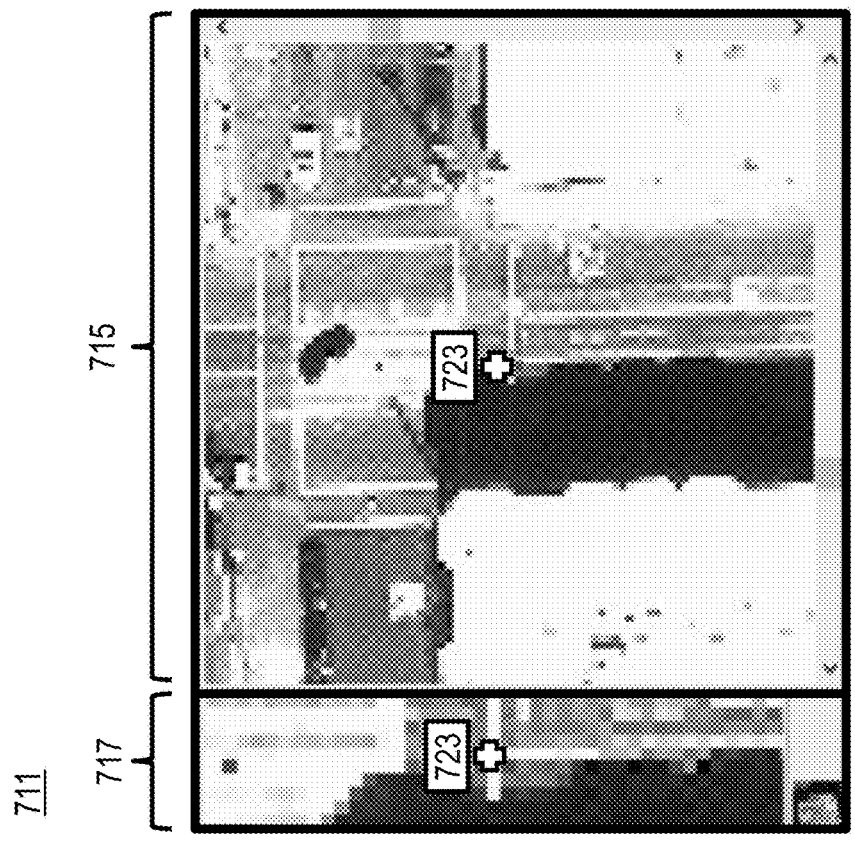

FIGS. 7A and 7B are diagrams illustrating multiple images of the same intersection feature, according to one embodiment. In this example, FIG. 7A illustrates a first top down image 711 that depicts an intersection with a physical feature 723 in a main view 715 and a zoomed view 717, and FIG. 7B illustrates a second top down image 713 of the same intersection with a physical feature 723 in the main view 719 and the zoomed view 721 captured at a different time. The image selection module 201, interacts with the feature detection module 203 to determine a pixel location of the feature 723 visible in the images. The first image 711 and second image 713 contain metadata such as camera position, orientation, focal length, etc. The metadata can be used to estimate the 3D position of the physical feature 723. In one embodiment, because the ground control point images can originate from any number of sources, the resolution, quality, etc. of each image can vary. For example, the resolution of top imagery of different satellites or other aerial sources can vary depending on the kind of camera sensors used. These different sensors then produce images with different resolutions.

Figure 8:
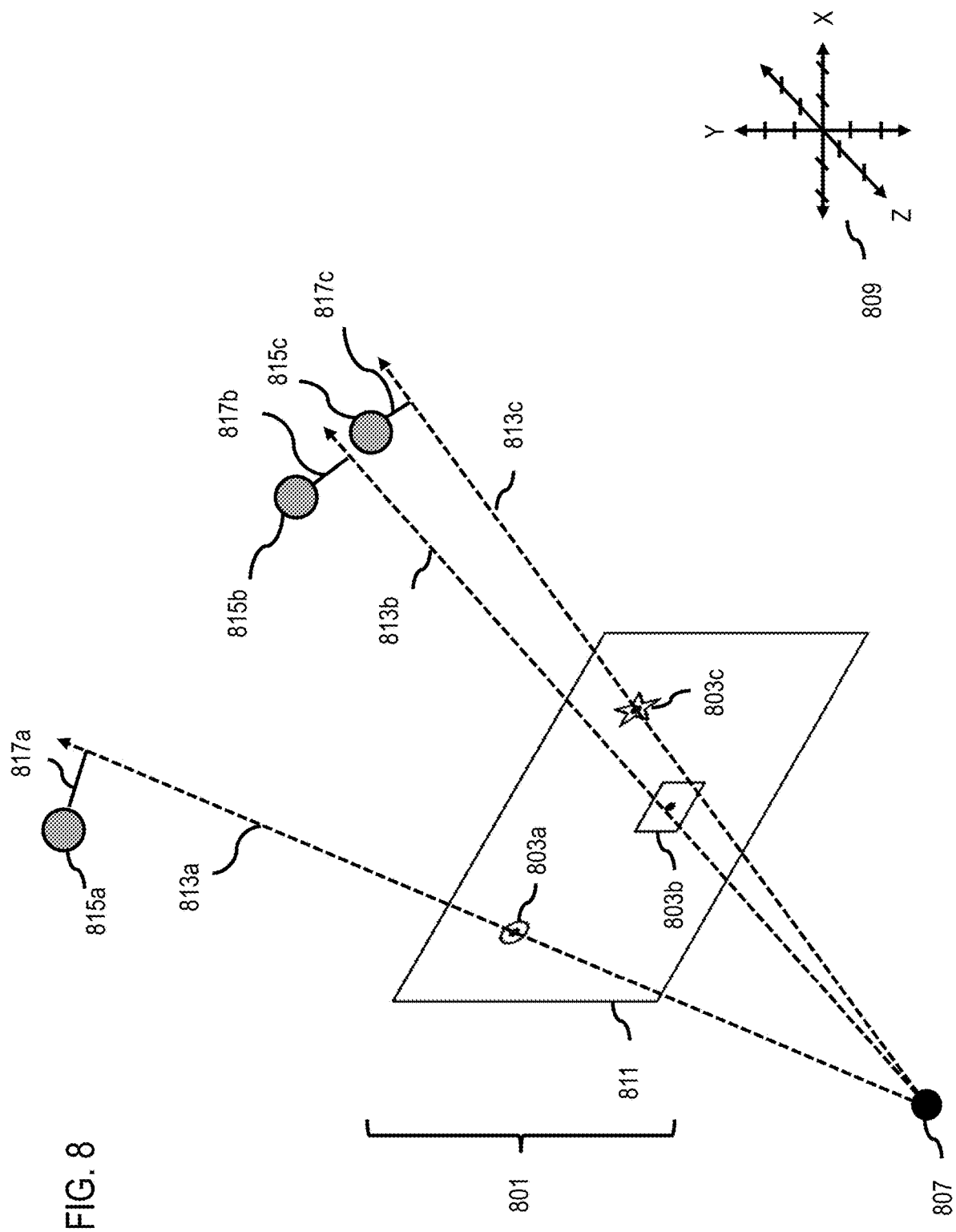
FIG. 8 is a diagram illustrating an example of projecting rays to determine quality of camera pose data, according to one embodiment.

FIG. 8 is a diagram illustrating an example of projecting rays to estimate the quality of camera pose data, according to one embodiment. As shown in the example of FIG. 8, image 801 is being processed to determine the quality of the camera pose data. Image 801 is labeled with features with known locations, detected at pixel locations 803a, 803b, and 803c. The mapping platform 103 uses the camera pose data associated with the image 801 to determine the respective camera location 807 with respect to a common or global coordinate system 809. The mapping platform 103 also uses the camera pose data and/or the camera parameters of the camera to determine the physical location of the image plane 811 (e.g., corresponding to image 801), which represents the location and orientation of the image 801 with respect to the coordinate system 809. The mapping platform 103 also uses the known locations of the features 815a, 815b, and 815c to determine the physical location of features 815a-815c with respect to the global coordinate system 809.

Then, for each of the labeled or detected pixel locations 803a-803c of the image 801, the mapping platform 103 generates respective rays 813a-813c originating from the camera position 807 through each of the labeled or detected pixel locations 803a-803c. To determine the quality of the camera pose data, the mapping platform 103 can iteratively evaluate the closeness between the rays 813a-813c and the respective features with known locations 815a-815c. For example, the first ray 813a passes by the known location of a first feature 815a. To determine the closeness values, the mapping platform 103 computes a line segment 817a between the first ray 813a and the location of the first feature 815a. As shown in FIG. 8 with respect to the first ray 813a the first line segment 817a is drawn so that it is orthogonal to the known location of the first feature 815a. In one embodiment, this orthogonality helps ensure that the line segments are the shortest or minimum distance between the first ray 813a and the known location of the first feature 815a.

The minimum perpendicular distances 817a-817c between the true location of the features 815a-815c and the corresponding rays 813a-813c is the discrepancy in the camera pose data. The minimum perpendicular distances 817a-817c can be aggregated using different measures of central tendency (e.g., mean, median, mode, and so forth). In another embodiment a weighting scheme based on the inverse distance of the features to the camera center 807 could be used since the confidence in observing a physical point by the camera changes inversely as a function of the distance from the capture.

The mapping platform 103 can provide an aggregation of minimum distance data indicating the quality of the camera pose data. The mapping platform 103 can calculate the deviation of the aggregated minimum perpendicular distances to provide an output associated with quality of the camera pose data. In one embodiment the mapping platform 103 can flag certain camera pose data as unreliable. The mapping platform 103 can flag certain camera pose data if the aggregation of minimum distances is greater than an error threshold. The mapping platform 103 can have a defined error threshold. The error threshold represents, for instance, the cutoff minimum distance value between the generated rays 813a-813c and the known location of the features 815a-815c that will be used to classify whether the camera pose data will be a quality outlier.

Figure 9:
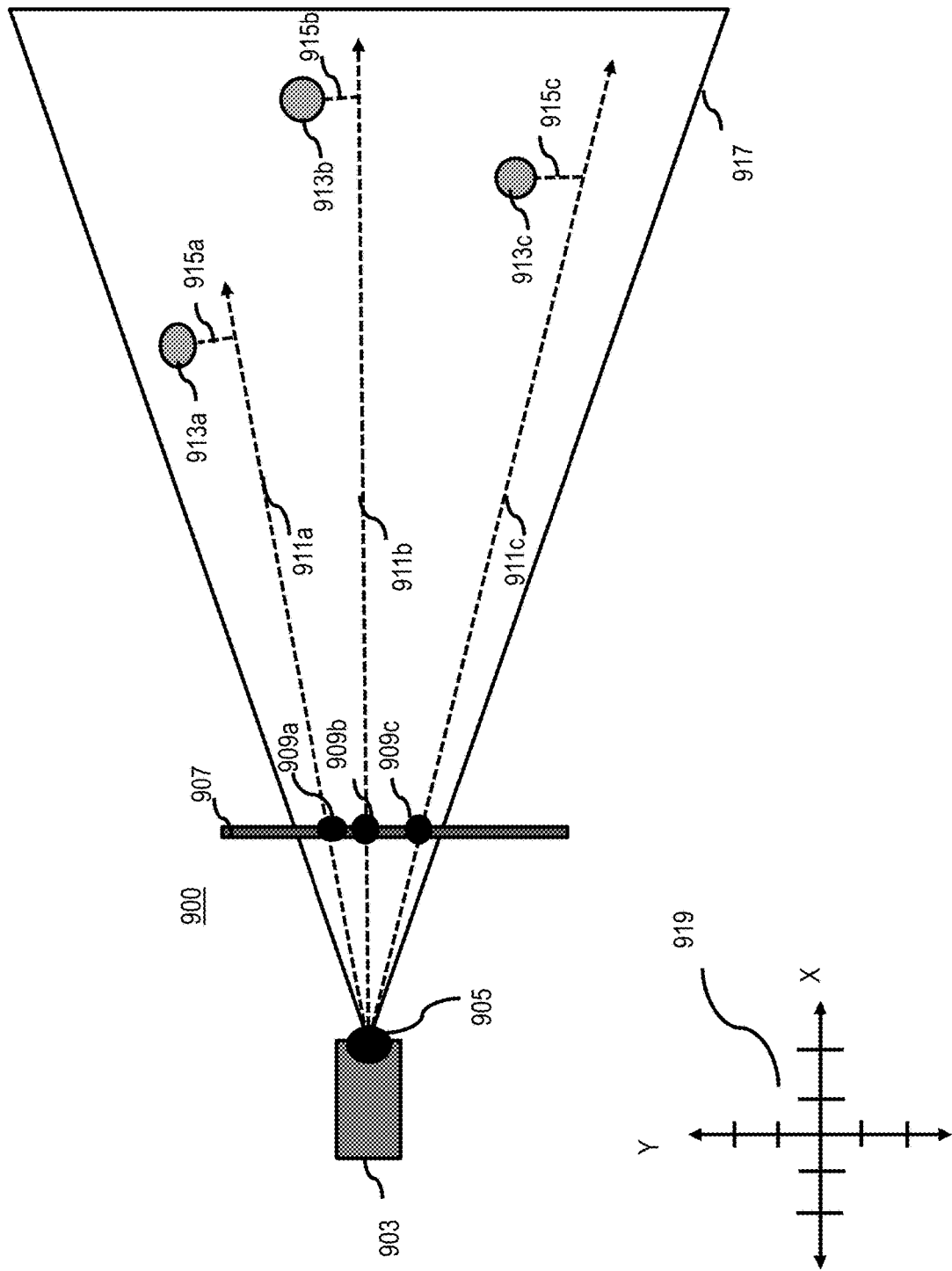
FIG. 9 is a diagram illustrating an example of projecting rays to determine quality of camera pose data, according to one embodiment.

FIG. 9 is a diagram illustrating an example of projecting rays to estimate the quality of camera pose data, according to one embodiment. As shown in the example of FIG. 9, image 900 is being processed to determine the quality of the camera pose data. Image 900 is labeled with features with known locations, detected at pixel locations 909a, 909b, and 909c. The mapping platform 103 uses the camera pose data associated with the image 900 to determine the respective camera location 903 with respect to a common or global coordinate system 919. The mapping platform 103 uses the camera pose data and/or the camera parameters of the camera to determine the physical location of the image plane 907, which represents the location and orientation of the image 900 with respect to the coordinate system 919. The mapping platform 103 also uses the known locations of the features 913a, 913b, and 913c to determine the physical location of features 913a-913c with respect to the global coordinate system 919.

Then, for each of the labeled or detected pixel locations 909a-909c of the image 900, the mapping platform 103 generates respective rays 911a-911c originating from the camera lens center 905 through each of the labeled or detected pixel locations 909a-909c. To determine the quality of the camera pose data, the mapping platform 103 can iteratively evaluate the closeness between the rays 911a-911c and the respective features with known locations 913a-913c. For example, the first ray 911a passes by the known location of a first feature 913a. To determine the closeness values, the mapping platform 103 computes a line segment 915a between the first ray 911a and the location of the first feature 913a. As shown in FIG. 9 with respect to the first ray 911a the first line segment 915a is drawn so that it is orthogonal to the known location of the first feature 913a. In one embodiment, this orthogonality helps ensure that the line segments are the shortest distance between the rays and the known location of the features.

The minimum perpendicular distances 915a-915c between the true location of the features 913a-913c and the corresponding rays 911a-911c is the discrepancy in the camera pose data. The minimum perpendicular distances 915a-915c can be aggregated using different measures of central tendency (e.g., mean, median, mode, and so forth). In another embodiment a weighting scheme based on the inverse distance of the features to the camera lens center 905 could be used since the confidence in observing a physical point by the camera changes inversely as a function of the distance from the capture.

The mapping platform 103 can provide an aggregation of minimum distance data indicating the quality of the camera pose data. The mapping platform 103 can calculate the deviation of the aggregated minimum perpendicular distances to provide an output associated with quality of the camera pose data. In one embodiment the mapping platform 103 can flag certain camera pose data as unreliable. The mapping platform 103 can flag certain camera pose data if the aggregation of minimum distances is greater than an error threshold. The mapping platform 103 can have a defined error threshold. The error threshold represents, for instance, the cutoff minimum distance value between the generated rays 911*a*-915*c* and the known location of the features 913*a*-915*c* that will be used to classify whether the camera pose data will be a quality outlier.

Figure 10A:
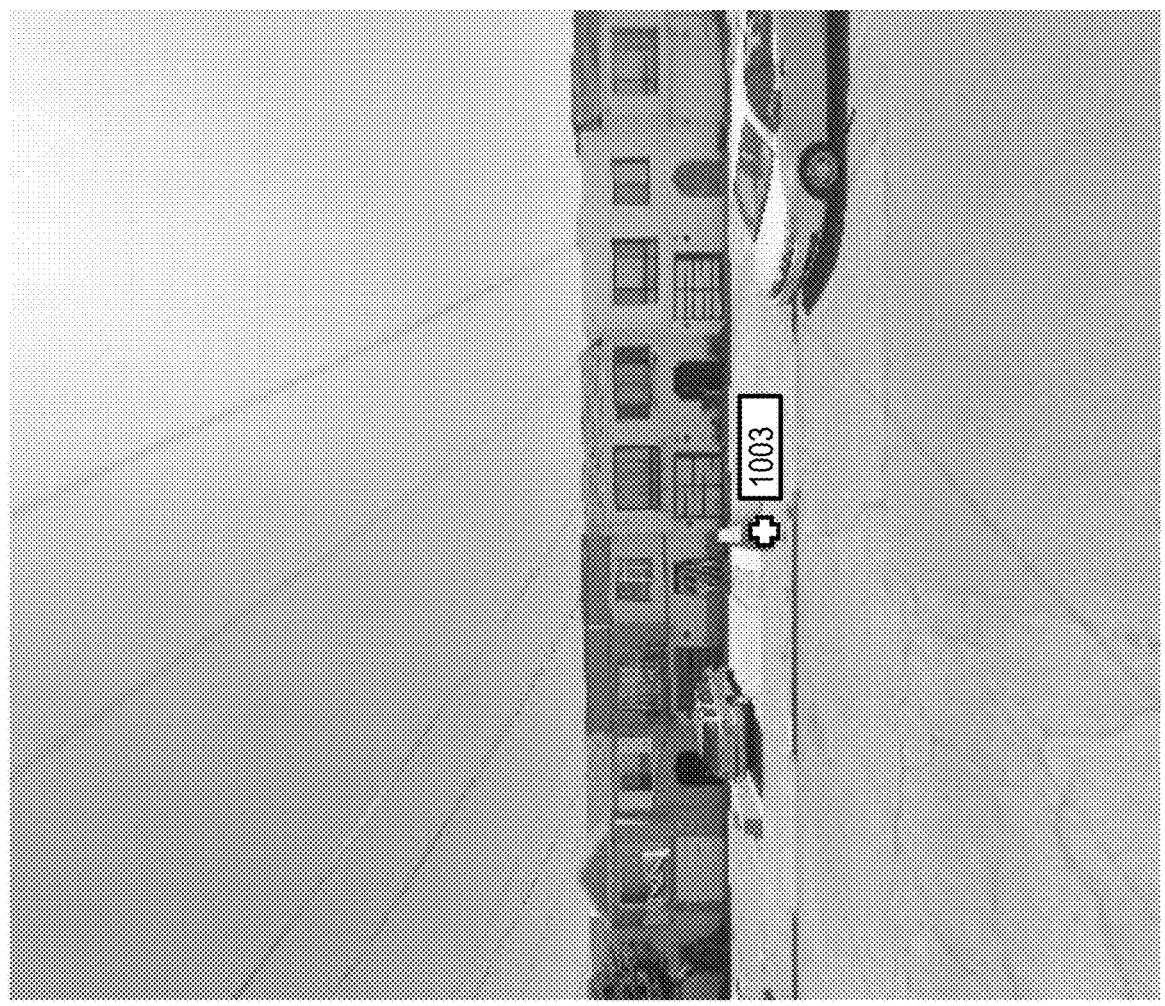
FIGS. 10A-10B are diagrams illustrating examples of multiple view imagery of a ground control point, according to one embodiment.
Figure 10B:

FIGS. 10A-10B are diagrams illustrating examples of multiple view imagery of a ground control point, according to one embodiment. In this example, FIG. 10A illustrates a first street-level image 1001 taken by a first camera, that depicts a physical feature 1003 with a known physical location. The image 1001 contains metadata such as camera pose data. The metadata can be used to estimate the 3D position of the physical feature 1003. The metadata can also be used to estimate the 3D position of the first camera.

FIG. 10B illustrates a top down image with the overlaid position of the first camera 1011 used to take the image 1001 and the physical feature 1003 with a known physical location. The mapping platform 103 can generate an output indicating the quality of the camera pose data using the known location of the physical feature 1003 according to the embodiments described above.

Returning to FIG. 1, as shown, the system 100 includes the mapping platform 103 for estimating the quality of camera pose data using ground control points of known quality according to the embodiments described herein. For example, with respect to autonomous, navigation, mapping, and/or other similar applications, the mapping platform 103 can detect quality of camera pose data based on using ground control points of known quality, according to the various embodiments described herein. In one embodiment, the machine learning system 119 of the mapping platform 10=3 includes a neural network or other machine learning system to make predictions from machine learning models. For example, when the input to the machine learning model are images with camera pose data of features with known physical locations used for the embodiments described herein, the output can include the aggregation of minimum distances that can be used to determine the quality of the camera pose data. In one embodiment, the neural network of the machine learning system 119 is a traditional convolutional neural network which consists of multiple layers of collections of one or more neurons (which are configured to process a portion of an input image. In one embodiment, the receptive fields of these collections of neurons (e.g., a receptive layer) can be configured to correspond to the area of an input image delineated by a respective a grid cell generated as described above.

In one embodiment, the machine learning system 119 and/or the computer vision system 117 also have connectivity or access over a communication network 121 to a geographic database 123 which stores the imagery for different sources (e.g., with different views or perspectives), extracted features, features correspondences, quality of camera pose data, derived maps, etc. generated according to the embodiments described herein. In one embodiment, the geographic database 123 includes representations of features and/or other related geographic features determined from feature correspondences to facilitate visual odometry to increase localization accuracy. In one embodiment, the machine mapping platform 103 has connectivity over a communication network 121 to the services platform 113 that provides one or more services 115. By way of example, the services 115 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 115 uses the output of the mapping platform 103 (e.g., location corrected images, features, etc.) to localize the vehicle 101 or UE 107 (e.g., a portable navigation device, smartphone, portable computer, tablet, etc.) and/or provide services 115 such as navigation, mapping, other location-based services, etc.

In one embodiment, the mapping platform 103 may be a platform with multiple interconnected components. The mapping platform 103 may include multiple servers, intelligent networking devices, computing devices, components and corresponding software for providing parametric representations of lane lines. In addition, it is noted that the mapping platform 103 may be a separate entity of the system 100, a part of the one or more services 115, a part of the services platform 113, or included within the UE 107 and/or vehicle 101.

In one embodiment, content providers 125*a*-125*m* (collectively referred to as content providers 125) may provide content or data (e.g., including geographic data, parametric representations of mapped features, etc.) to the geographic database 123, the mapping platform 103, the services platform 113, the services 115, the UE 107, the vehicle 101, and/or an application 109 executing on the UE 107. The content provided may be any type of content, such as map content, textual content, audio content, video content, image content, etc. In one embodiment, the content providers 125 may provide content that may aid in the detecting and classifying of lane lines and/or other features in image data and estimating the quality of the detected features. In one embodiment, the content providers 125 may also store content associated with the geographic database 123, mapping platform 103, machine learning system 119, computer vision system 117, services platform 113, services 115, UE 107, and/or vehicle 101. In another embodiment, the content providers 125 may manage access to a central repository of data, and offer a consistent, standard interface to data, such as a repository of the geographic database 123.

In one embodiment, the UE 107 and/or vehicle 101 may execute a software application 109 to capture image data or other observation data for determining the quality of camera pose data according to the embodiments described herein. By way of example, the application 109 may also be any type of application that is executable on the UE 107 and/or vehicle 101, such as autonomous driving applications, mapping applications, location-based service applications, navigation applications, content provisioning services, camera/imaging application, media player applications, social networking applications, calendar applications, and the like. In one embodiment, the application 109 may act as a client for the mapping platform 103 and perform one or more functions associated with estimating the quality of camera pose data alone or in combination with the machine learning system 119.

By way of example, the UE 107 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with the vehicle 101 or be a component part of the vehicle 101.

In one embodiment, the UE 107 and/or vehicle 101 are configured with various sensors for generating or collecting environmental image data (e.g., for processing by the mapping platform 103), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 107 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 107 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 107 and/or vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 103, machine learning system 119, computer vision system 117, services platform 113, services 115, UE 107, vehicle 101, and/or content providers 125 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 11 is a diagram of a geographic database, according to one embodiment. In one embodiment, the geographic database 123 includes geographic data 1101 used for (or configured to be compiled to be used for) mapping and/or navigation-related services, such as for video odometry based on the mapped features (e.g., lane lines, road markings, signs, etc.). In one embodiment, the geographic database 123 includes high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 1111) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 1103, road segment or link data records 1105, POI data records 1107, quality of camera pose data records 1109, HD mapping data records 1111, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 123. In one embodiment, the indexes 1113 may be used to quickly locate data without having to search every row in the geographic database 123 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 1107. The geographic database 123 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the geographic database 123 can also quality of camera pose data records 1109 for storing the identified feature correspondences (e.g., image-to-image correspondences, image-to-ground correspondences, etc.), camera geometry parameters, location corrected images, location corrected features, location corrected camera models/poses, as well as other related data used or generated according to the various embodiments described herein. By way of example, the quality of camera pose data records 1109 can be associated with one or more of the node records 1103, road segment records 1105, and/or POI data records 1107 to support localization or visual odometry based on the features stored therein and the corresponding estimated quality of the features. In this way, the records 1109 can also be associated with or used to classify the characteristics or metadata of the corresponding records 1103, 1105, and/or 1107.

In one embodiment, as discussed above, the HD mapping data records 1111 model road surfaces and other map features to centimeter-level or better accuracy. The HD mapping data records 1111 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1111 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 1111 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1111.

In one embodiment, the HD mapping data records 1111 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 125 in association with the services platform 113 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 107) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for estimating the quality of camera pose data based on ground control points of known quality may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
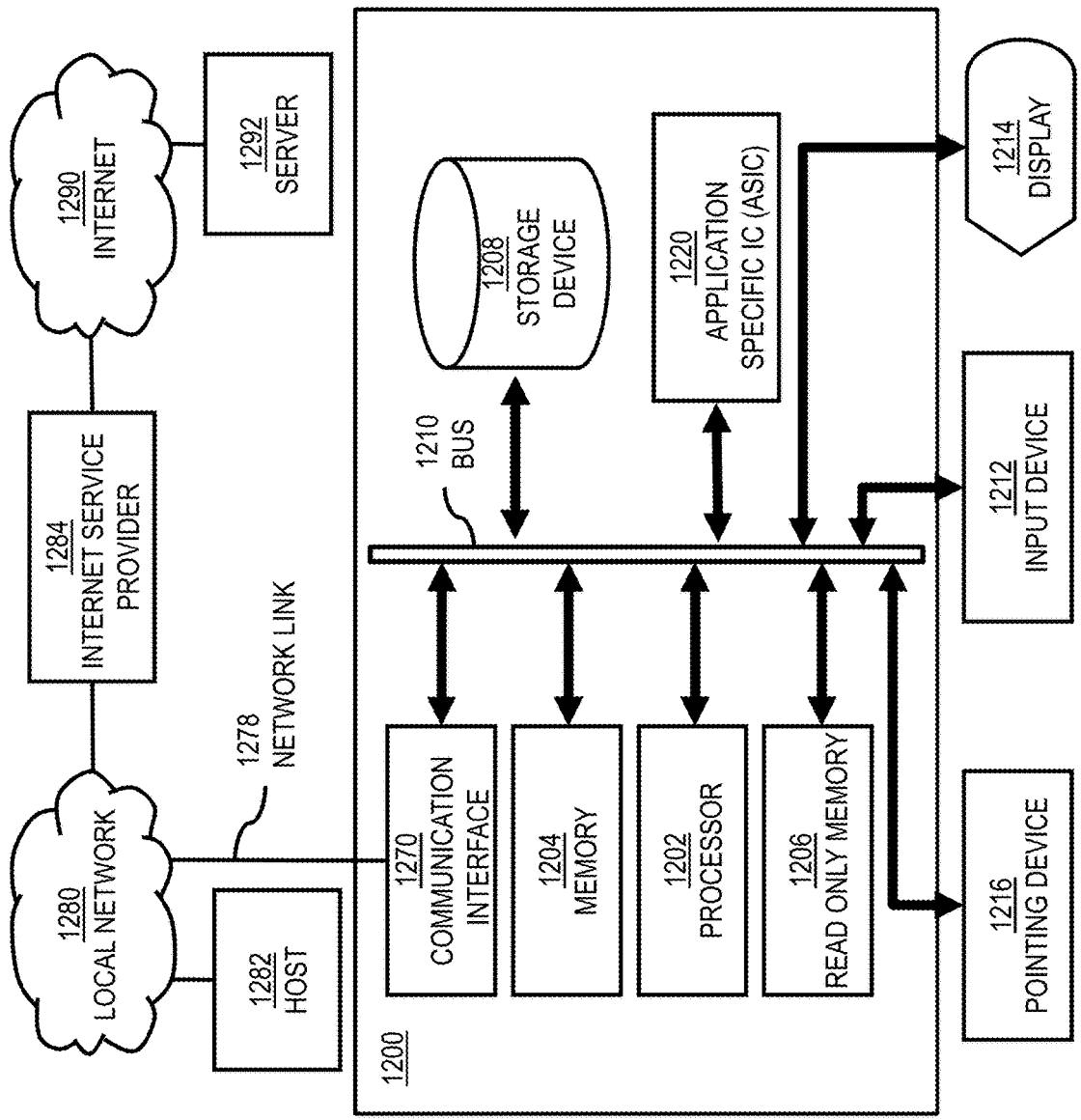
FIG. 12 is a diagram of hardware that can be used to implement an embodiment.

FIG. 12 illustrates a computer system 1200 upon which an embodiment of the invention may be implemented. Computer system 1200 is programmed (e.g., via computer program code or instructions) to estimate the quality of camera pose data based on ground control points of known quality as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to estimating the quality of camera pose data based on ground control points of known quality may. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing quality of camera pose data based on ground control points of known quality. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing quality of camera pose data based on ground control points of known quality, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 121 for providing quality of camera pose data based on ground control points of known quality.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 13:
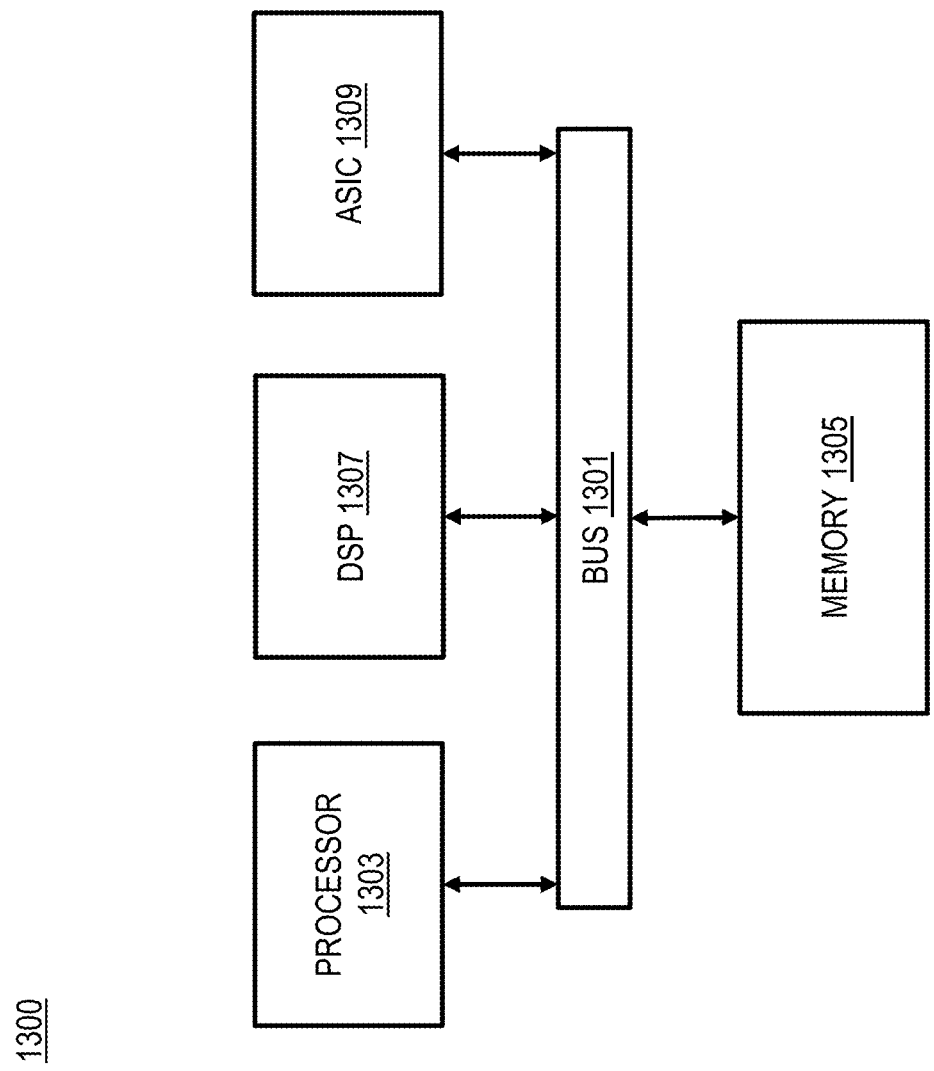
FIG. 13 is a diagram of a chip set that can be used to implement an embodiment.

FIG. 13 illustrates a chip set 1300 upon which an embodiment of the invention may be implemented. Chip set 1300 is programmed to provide quality of camera pose data based on ground control points of known quality as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide quality of camera pose data based on ground control points of known quality. The memory 1305 also stores the data associated with or generated by the execution of the inventive steps.

Figure 14:
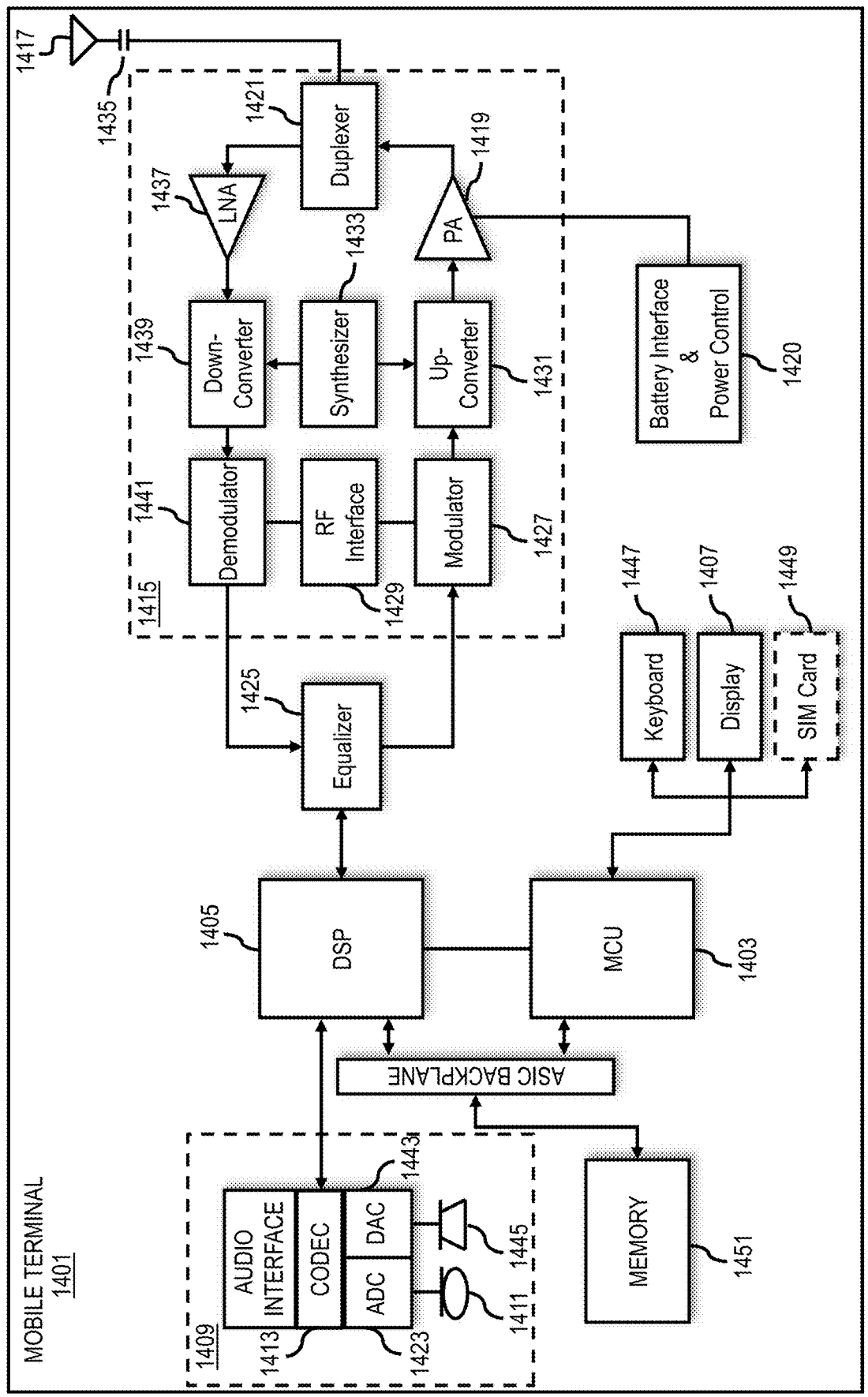
FIG. 14 is a diagram of a mobile terminal (e.g., handset, vehicle, or component thereof) that can be used to implement an embodiment.

FIG. 14 is a diagram of exemplary components of a mobile terminal (e.g., vehicle 101, UE 107, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide quality of camera pose data based on ground control points of known quality. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    identifying camera pose data for a camera used to capture an image;
    processing the image to determine a pixel location of one or more features visible in the image, wherein each feature of the one or more features has a known physical location;
    determining a camera physical location of the camera based on the camera pose data;
    determining an image plane physical location of the image plane of the image based on the camera pose data, one or more camera parameters of the camera, or a combination thereof;
    projecting a ray from the camera physical location through the image plane physical location corresponding to the pixel location determined for said each feature;
    computing a minimum distance between the projected ray and the known physical location of said each feature; and
    providing an aggregation of the minimum distance for said each feature as an output indicating a quality of the camera pose data.

2. The method of claim 1, wherein the one or more features include one or more ground control points.

3. The method of claim 1, further comprising:
    determining a margin of error of the known physical location for said each feature;
    computing a deviation of the aggregation based on the margin of error for said each feature;
    computing a confidence in the camera pose data based on a deviation.

4. The method of claim 1, wherein the minimum distance for said each feature indicates an error in the camera pose data, and wherein the quality of the camera pose data is based on the error.

5. The method of claim 1, wherein the aggregation is based on a weighting scheme for said each feature.

6. The method of claim 5, wherein the weighting scheme is based on an inverse of the minimum distance determined for said each feature.

7. The method of claim 1, wherein the aggregation is performed based on a central tendency measure.

8. The method of claim 1, wherein the camera physical location is determined with respect to a center of the camera.

9. The method of claim 1, wherein the minimum distance is a minimum perpendicular distance.

10. The method of claim 1, further comprising:
    generating a user interface depicting the quality of the camera pose data in relation to a representation of the camera pose data, the camera, the one or more features, the camera physical location, the image plane physical location, or a combination thereof.

11. An apparatus comprising:
    at least one processor; and
    at least one memory including computer program code for one or more programs, the at least one memory and the computer program code configured to, with the at least one processor, cause the apparatus to perform at least the following:
    identify camera pose data for a camera used to capture an image;
    process the image to determine a pixel location of one or more features visible in the image, wherein each feature of the one or more features has a known physical location;
    determine a camera physical location of the camera based on the camera pose data;
    determine an image plane physical location of the image plane of the image based on the camera pose data, one or more camera parameters of the camera, or a combination thereof;
    project a ray from the camera physical location through the image plane physical location corresponding to the pixel location determined for said each feature;
    compute a minimum distance between the projected ray and the known physical location of said each feature; and
    provide an aggregation of the minimum distance for said each feature as an output indicating a quality of the camera pose data.

12. The apparatus of claim 11, wherein the one or more features include one or more ground control points.

13. The apparatus of claim 11, wherein the apparatus is further caused to:
    determine a margin of error of the known physical location for said each feature;
    compute a deviation of the aggregation based on the margin of error for said each feature;
    compute a confidence in the camera pose data based on a deviation.

14. The apparatus of claim 11, wherein the minimum distance for said each feature indicates an error in the camera pose data, and wherein the quality of the camera pose data is based on the error.

15. The apparatus of claim 11, wherein the aggregation is based on a weighting scheme for said each feature.

16. A non-transitory computer-readable storage medium carrying one or more sequences of one or more instructions which, when executed by one or more processors, cause an apparatus to perform:
    identifying camera pose data for a camera used to capture an image;

processing the image to determine a pixel location of one or more features visible in the image, wherein each feature of the one or more features has a known physical location;

determining a camera physical location of the camera based on the camera pose data;

determining an image plane physical location of the image plane of the image based on the camera pose data, one or more camera parameters of the camera, or a combination thereof;

projecting a ray from the camera physical location through the image plane physical location corresponding to the pixel location determined for said each feature;

computing a minimum distance between the projected ray and the known physical location of said each feature; and providing an aggregation of the minimum distance for said each feature as an output indicating a quality of the camera pose data.

17. The non-transitory computer-readable storage medium of claim 16, wherein the one or more features include one or more ground control points.

18. The non-transitory computer-readable storage medium of claim 16, wherein the apparatus is caused to further perform:

determining a margin of error of the known physical location for said each feature;

computing a deviation of the aggregation based on the margin of error for said each feature;

computing a confidence in the camera pose data based on a deviation.

19. The non-transitory computer-readable storage medium of claim 16, wherein the minimum distance for said each feature indicates an error in the camera pose data, and wherein the quality of the camera pose data is based on the error.

20. The non-transitory computer-readable storage medium of claim 16, wherein the aggregation is based on a weighting scheme for said each feature.

* * * * *